(12) United States Patent
Kouzel

(10) Patent No.: US 10,975,807 B2
(45) Date of Patent: Apr. 13, 2021

(54) SOURCE OF WATER FOR WATER INJECTION SYSTEM

(71) Applicant: CLARK EQUIPMENT COMPANY, Statesville, NC (US)

(72) Inventor: Richard Kouzel, Mooresville, NC (US)

(73) Assignee: CLARK EQUIPMENT COMPANY, Statesville, NC (US)

(*) Notice: Subject to any disclaimer, the term of this patent is extended or adjusted under 35 U.S.C. 154(b) by 0 days.

(21) Appl. No.: 15/586,708

(22) Filed: May 4, 2017

(65) Prior Publication Data

US 2018/0320638 A1 Nov. 8, 2018

(51) Int. Cl.
| | | |
|---|---|---|
| *F02B 47/02* | (2006.01) | |
| *F02M 25/028* | (2006.01) | |
| *F02M 25/022* | (2006.01) | |
| *F02B 63/06* | (2006.01) | |
| *F02B 29/04* | (2006.01) | |
| *F02M 25/025* | (2006.01) | |
| *F02B 39/02* | (2006.01) | |

(52) U.S. Cl.
CPC ....... *F02M 25/028* (2013.01); *F02B 29/0468* (2013.01); *F02B 63/06* (2013.01); *F02M 25/025* (2013.01); *F02M 25/0222* (2013.01); *F02B 39/02* (2013.01)

(58) Field of Classification Search
CPC .... F02M 25/028; F02M 25/0222; F02B 63/06
USPC ...................................................... 123/25 R
See application file for complete search history.

(56) References Cited

U.S. PATENT DOCUMENTS

| | | | |
|---|---|---|---|
| 3,672,341 A | 6/1972 | Smith | |
| 3,696,795 A | 10/1972 | Smith | |
| 3,785,755 A * | 1/1974 | Novak | ................ F04C 29/0007 418/85 |

(Continued)

FOREIGN PATENT DOCUMENTS

| | | |
|---|---|---|
| CN | 205207119 U | 5/2016 |
| DE | 102006054227 A1 | 5/2008 |

(Continued)

OTHER PUBLICATIONS

International Search Report and Written Opinion for Application No. PCT/US2018/028080 dated Jul. 27, 2018, 12 pages.

(Continued)

*Primary Examiner* — Hung Q Nguyen
*Assistant Examiner* — Anthony Donald Taylor, Jr.
(74) *Attorney, Agent, or Firm* — Michael Best & Friedrich LLP

(57) ABSTRACT

An air compression system includes an internal combustion engine operable to produce a power output in response to combustion of a fuel-air mixture, and an air compressor driven by the internal combustion engine and operable to draw in atmospheric air and discharge a mixed flow of compressed air and water. A water injection system supplies water to the fuel-air mixture and into the internal combustion engine, a separator assembly in communication with the air compressor separates a portion of the water from the compressed air, and a water passageway interconnects the separator assembly and the water injection system such that the air compressor supplies water to the water injection system.

15 Claims, 2 Drawing Sheets

(56) References Cited

U.S. PATENT DOCUMENTS

| | | | |
|---|---|---|---|
| 5,718,194 A | 2/1998 | Binion | |
| 6,571,749 B2 | 6/2003 | Singh | |
| 6,655,327 B1* | 12/2003 | Hedman | F02B 29/00 123/68 |
| 7,043,934 B2* | 5/2006 | Radermacher | B01D 5/0039 62/285 |
| 7,980,076 B2* | 7/2011 | Buia | F02B 29/0468 123/563 |
| 8,459,957 B2 | 6/2013 | Takeda | |
| 8,585,376 B2 | 11/2013 | Kameya | |
| 8,616,856 B2* | 12/2013 | Matsuzaka | F04B 39/06 417/228 |
| 8,672,647 B2 | 3/2014 | Kawabata | |
| 8,721,308 B2 | 5/2014 | Shiinoki | |
| 8,747,091 B2 | 6/2014 | Noguchi | |
| 8,851,025 B2 | 10/2014 | Voisin | |
| 8,935,996 B2 | 1/2015 | Mulye | |
| 9,010,112 B2 | 4/2015 | Palm | |
| 9,109,500 B2* | 8/2015 | Cockerill | F02B 29/04 |
| 9,394,825 B2* | 7/2016 | Dziubinschi | F02B 29/0468 |
| 9,932,921 B2* | 4/2018 | Hoard | F02D 41/0077 |
| 2003/0159665 A1* | 8/2003 | Coney | F02B 25/14 123/65 VD |
| 2004/0079079 A1* | 4/2004 | Martin | F01N 3/005 60/605.2 |
| 2010/0229549 A1* | 9/2010 | Taylor | F02B 29/0468 60/599 |
| 2011/0094219 A1* | 4/2011 | Palm | F02B 29/0468 60/599 |
| 2013/0297183 A1 | 11/2013 | Dieler | |
| 2013/0318946 A1 | 12/2013 | Morris | |
| 2015/0114338 A1* | 4/2015 | Feinstein | F02C 3/113 123/25 A |
| 2015/0176478 A1 | 6/2015 | Wicks et al. | |
| 2015/0300296 A1 | 10/2015 | Mulye | |
| 2015/0361975 A1* | 12/2015 | Kouzel | F04B 49/225 417/53 |
| 2017/0114738 A1* | 4/2017 | Hoard | F02M 26/07 |

FOREIGN PATENT DOCUMENTS

| | | |
|---|---|---|
| EP | 2607647 A1 | 6/2013 |
| JP | 2012002209 | 1/2012 |
| WO | WO-2013024199 A2 | 2/2013 |

OTHER PUBLICATIONS

International Preliminary Report on Patentability dated Nov. 14, 2019 for related application No. PCT/US2018/028080 (8 pages).

* cited by examiner

SOURCE OF WATER FOR WATER INJECTION SYSTEM

FIELD OF THE INVENTION

The present invention relates to a water injection system, and more specifically to a water injection system for an internal combustion engine.

BACKGROUND

Water injection is a proven technique for raising the threshold at which detonation (or pre-ignition) takes place in an internal combustion engine (ICE). An increased pre-ignition threshold enables the use of lower octane and/or cetane fuels in tandem with higher compression ratios for higher power output and increased operating range.

SUMMARY

In one embodiment, an air compression system includes an internal combustion engine operable to produce a power output in response to combustion of a fuel-air mixture, and an air compressor driven by the internal combustion engine and operable to draw in atmospheric air and discharge a mixed flow of compressed air and water. A water injection system supplies water to the fuel-air mixture and into the internal combustion engine, a separator assembly in communication with the air compressor separates a portion of the water from the compressed air, and a water passageway interconnects the separator assembly and the water injection system such that the air compressor supplies water to the water injection system.

In another embodiment, a method of operating an air compressor includes compressing ambient air using an air compressor to convert the ambient air to compressed air and water, combusting a fuel-air mixture in an internal combustion engine to power the air compressor, and separating the water from the compressed air exiting the air compressor in a separating assembly. The method also includes collecting the water from the separating assembly, and feeding a portion of the collected water to the fuel-air mixture and the internal combustion engine with a water injection system for combustion in the internal combustion engine.

In another embodiment, an air compressor system includes an air compressor operable to draw in ambient air and compress that air to produce a flow of compressed air and water, an engine coupled to the air compressor and operable in response to the combustion of a flow of fuel to power the air compressor, and a moisture separator assembly coupled to the air compressor and arranged to receive the flow of compressed air and water, the moisture separator assembly operable to separate a portion of the water from the flow of compressed air and water and to discharge a flow of compressed dry air and a separate flow of liquid water. A reservoir is positioned to receive the flow of liquid water, a water injection system is coupled to the engine and is operable to draw water from the reservoir and inject that water into the engine for combustion, and a controller is operable to vary the quantity of water delivered to the engine.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
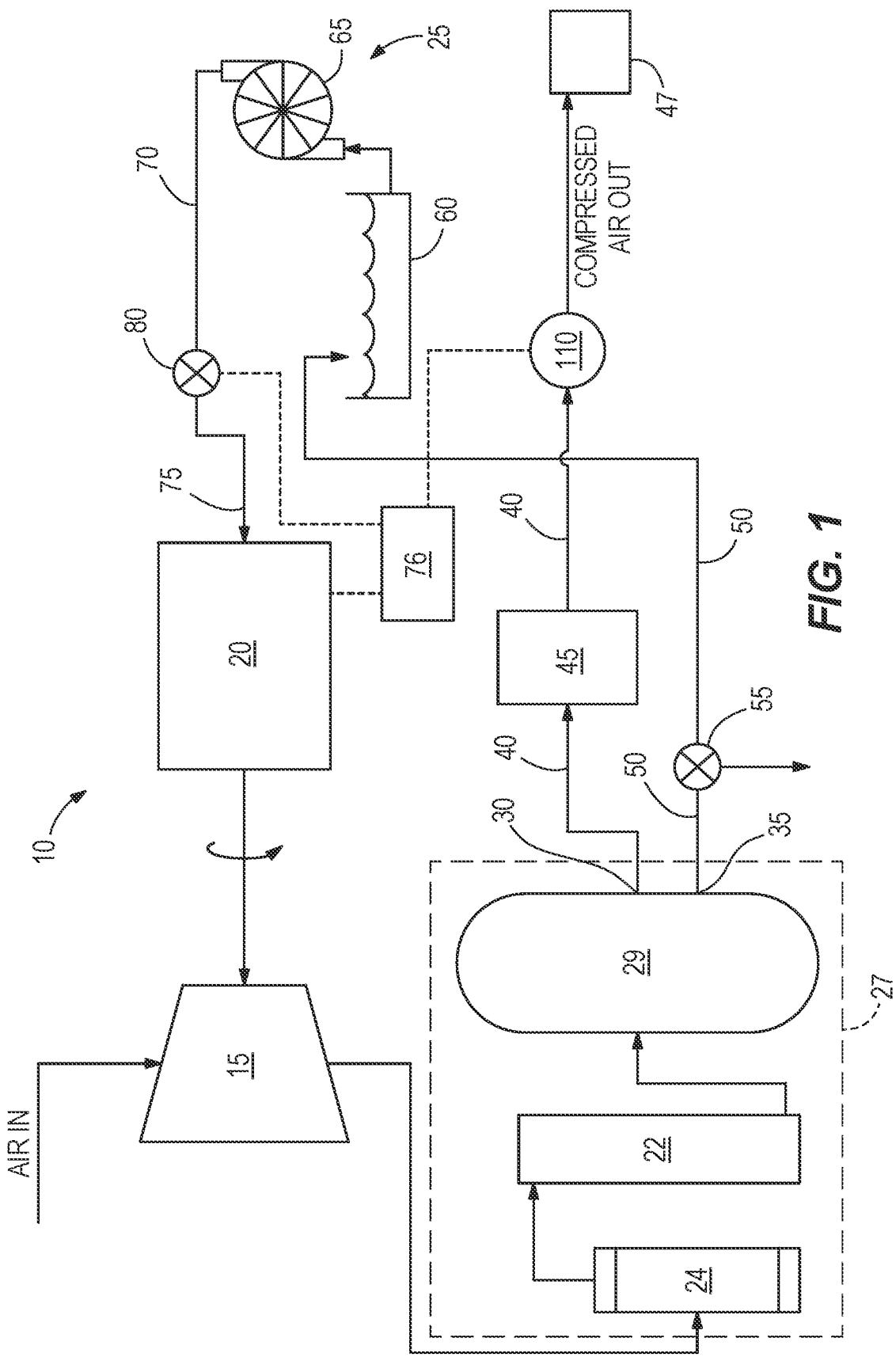
FIG. 1 is a schematic of a power system including an internal combustion engine and a liquid water injection system according to one embodiment of the present invention.

FIG. 1 illustrates an air compressor system 10 including an air compressor 15 (e.g., a rotary screw compressor), an internal combustion engine (i.e., ICE) 20 for providing work to drive the air compressor 15, and a water injection system 25 that provides water to the ICE 20. As those of skill in the art will understand, all air contains some water vapor. As the air is compressed, the dew point (i.e., the temperature at which condensation occurs), as well as the temperature of the air rises. Typically, the temperature remains above the dew point within a compressor so that condensation does not occur. However, to meet customer expectations for compressed air approach temperatures, and implicitly compressed air moisture levels, an air-air heat exchanger or aftercooler 22 is often integrated into the compressed air discharge lines downstream of a separator tank 24 to reduce the compressed air discharge temperature. Typically, this temperature reduction is accompanied by water condensation as the resultant temperatures are below the dew point for the system in question and common ambient conditions. In some constructions a liquid water separator 29 is positioned downstream of the aftercooler 22 to remove the additional condensate. Thus, an air compressor typically draws in atmospheric air (which includes water vapor) and discharges a flow of compressed air and water, wherein the water is in the form of liquid water and/or water vapor. To separate this condensate, the system 10 also incorporates a moisture separator assembly 27 having the aftercooler 22, the separator tank 24, and a liquid water separator 29.

With reference to FIG. 1, the separator assembly 27 includes a first or "air outlet" 30 for allowing air to exit the separator assembly 27 and a second or "liquid outlet" 35 for allowing liquid to exit the separator assembly 27. The air outlet 30 is coupled to an air passageway 40 and may be in communication with a filter 45 to further remove hydrocarbon content from the compressed air stream. The liquid outlet 35 is coupled to a liquid passageway 50 and is in communication with the water injection system 25. The liquid passageway 50 may include a valve 55 that is operable to redirect or discharge liquid passing through the liquid passageway 50 when there is an excess of liquid from the separator assembly 27.

With continued reference to FIG. 1, the water injection system 25 includes a reservoir 60 that provides water to a pump 65 which, in turn, provides water via a fluid conduit 70 to a water injector unit 75. The water injector unit 75 is coupled to and in communication with the ICE 20 to provide direct water injection to the ICE 20. For example, the water injector unit 75 may inject water into the ICE 20 at each compression cycle or some other various timing pattern.

Upstream of the water injector unit 75 is a valve 80 that is in communication with a control system 76. The valve 80 regulates the amount of time at which water is directed to the water injector unit 75. The location at which water is injected into the ICE 20 is not critical. Therefore, water could be injected into an air stream 100, a fuel stream 90, a mixed fuel-air stream, or directly into an engine piston-cylinder 85 as may be desired.

In operation, the internal combustion engine 20 is powered through a typical fuel-combustion process. In this case, the ICE 20 provides work into the air compressor 15 to drive the compressor 15. As the air compressor 15 is driven by the ICE 20, air enters the air compressor 15 at an ambient pressure and exits the air compressor at a higher pressure based in part on the compression ration of the compressor 15. From there, the separator assembly 27 receives the compressed air. As noted above, the compressed air can cool to a temperature below the dew point of the compressed air, thereby allowing for condensation in the compressed air. The separator assembly 27 separates the liquid water from the compressed air. The liquid water is directed toward the liquid outlet 35 and passed through the liquid passageway 50. Simultaneously, the compressed air and water vapor within the separator assembly 27, is directed toward the air outlet 30, passes through the air passageway 40 and the filter 45, and exits the system 10 as compressed air where it can be used as desired. For example, the compressed air can be used in an on-demand user application 47 (e.g., compressed air storage in a storage tank, driving a pneumatic power tool, filling tires, etc.).

Figure 2:
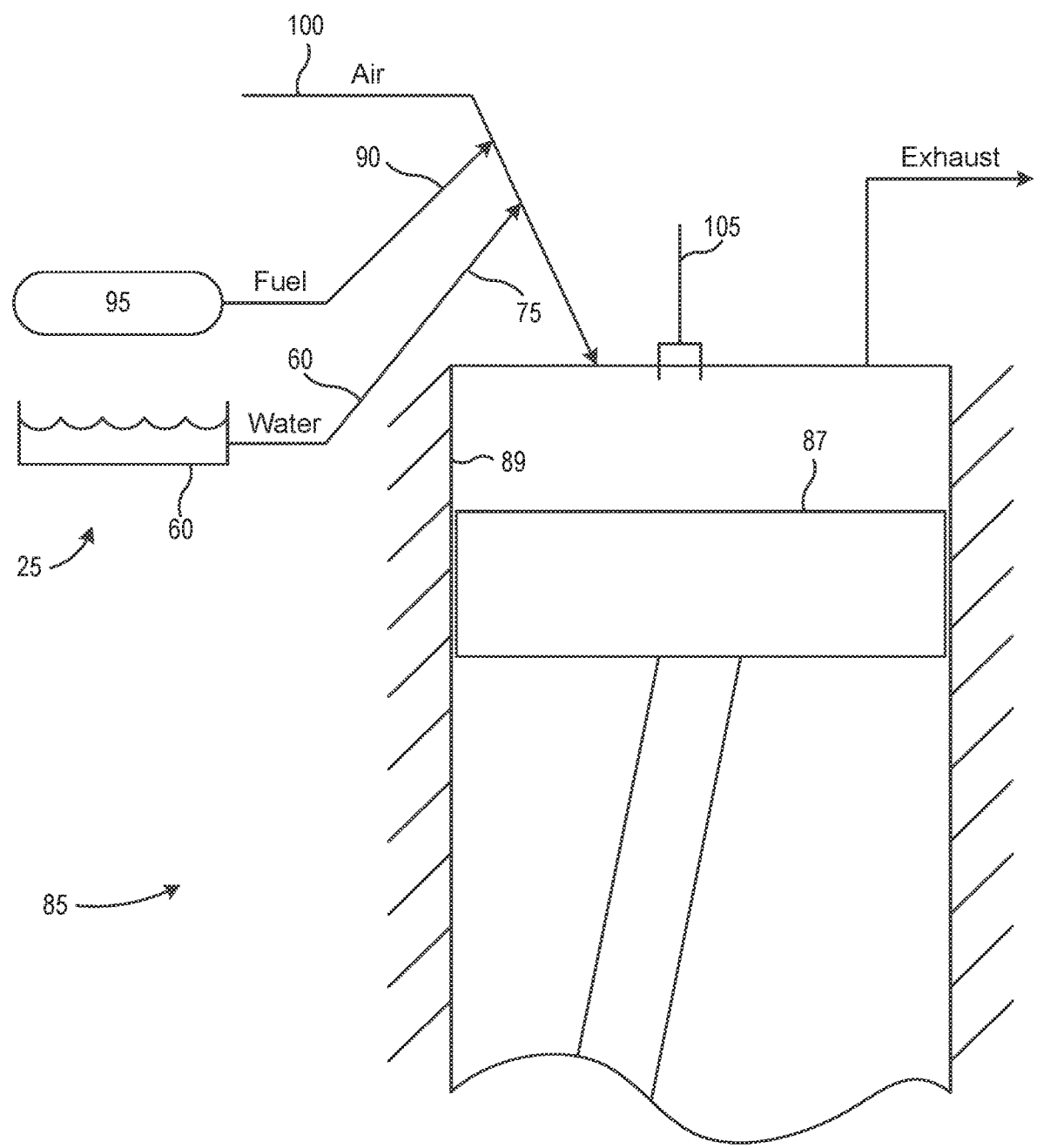
FIG. 2 is a schematic of a portion of the power system of FIG. 1.

With reference to FIG. 2, the piston-cylinder 85 of the ICE 20 is in communication with the reservoir 60 of the water injection system 25. The piston-cylinder 85 is a conventional piston-cylinder arrangement having a piston 87 that reciprocates within a cylinder 89. While a common piston-cylinder arrangement 85 is illustrated in FIG. 2, the ICE 20 could include a rotary engine, could be a diesel engine, and could include more than one piston-cylinder as required by the particular construction.

When water is desired, the water, air, and fuel are mixed in the cylinder 85 to facilitate the desired combustion process, or prior to entry into the cylinder 85 for combustion. The water facilitates a temperature reduction of the intake charge and introduces increased oxygen content for the combustion process. The temperature reduction results in a corresponding increase in combustion air density enabling a proportional increase in fuel to be introduced. Collectively, all of these effects enable increased power density for the engine in question. The illustrated ICE 20 includes a spark plug 105 or similar igniter for igniting the fuel (e.g., gasoline, petrol, alcohol, natural gas, etc.). In other embodiments, the ICE 20 may alternatively employ compression ignition like that used in diesel powered engines, with or without the addition of the igniter 105. Once the fuel has ignited during the compression cycle, the exhaust is discharged out to ambient surroundings.

In one operating mode, a controller 76 (or control system 76) monitors the engine load for controlling when and how much water is injected into the ICE 20. Specifically, the ICE 20 includes a demand sensor 110 positioned to measure a value indicative of the power output of the ICE 20 by measuring a compressed air flow rate. The controller 76 receives a signal from the demand sensor 110 indicative of the measured flow rate, and the controller 76 varies a power level of the ICE 20 at least partially in response to the measured flow rate. Also, the controller 76 varies the quantity of water delivered to the ICE 20 at least partially in response to the measured flow rate. For example, when the engine load exceeds a predetermined value, the water injection system 25 is activated to provide water, and therefore extra power, to the ICE 20. When water is called for, the valve 80 is opened at the proper time intervals to inject the proper quantity of water into the piston-cylinder 85.

The water injection system 25 is advantageous as it uses water that is produced naturally as a by-product of the air compression and cooling processes of the air compressor 15. Typically viewed as a waste, the water produced from the air compressor 15 is collected in the reservoir 60 and used by the water injection system 25. Typically, water injection systems for use with mobile applications are difficult to implement due to a lack of maintenance-free, continuous source of water. However, the ICE 20 and the water injection system 25 have a maintenance-free, continuous source of water via the air compressor 15.

In addition, the use of water injection can increase the maximum power output of the engine 20 such that it might be possible to use a smaller engine than what might be required without water injection.

The term "dry air" as used herein describes air or a flow of air after passing through the separator assembly 29 or other separator to remove a portion of the water vapor contained in the air or the air stream. "Dry air" does not mean that 100 percent of the moisture contained in the air or the air stream is removed.

Thus, the invention provides, among other things, a maintenance-free, continuous source of water for an internal combustion engine configured to incorporate water injection as part of its combustion process. Various features and advantages of the invention are set forth in the following claims.

What is claimed is:

1. An air compression system comprising:
an internal combustion engine operable to produce a power output in response to a combustion of a fuel-air mixture;
an air compressor driven by the internal combustion engine and operable to draw in atmospheric air and discharge a mixed flow of compressed air and water;
a moisture separator assembly in communication with the air compressor and operable to separate the mixed flow of compressed air and water into a flow of compressed dry air and a separate flow of water;
a water injection system operable to supply the flow of water to the fuel-air mixture and into the internal combustion engine;
a water passageway interconnecting the moisture separator assembly and the water injection system, the water passageway configured to direct the flow of water from the moisture separator assembly to the water injection system;
an air passageway between an on-demand user application and the moisture separator assembly, the air passageway configured to direct the flow of compressed dry air away from the internal combustion engine and to the on-demand user application to exit the air compression system;
a sensor coupled to the air passageway and configured to detect a flow rate of the compressed dry air through the air passageway; and
a control system coupled to the internal combustion engine and the water injection system, the control system configured to regulate a quantity of water supplied to the internal combustion engine by the water injection system in response to the detected flow rate of the compressed dry air by the sensor.

2. The air compression system of claim 1, wherein the water injection system includes a reservoir for collecting water.

3. The air compression system of claim 2, further comprising a water pump that pumps water from the reservoir to the internal combustion engine.

4. The air compression system of claim 1, wherein the moisture separator assembly includes a separator tank and a cooler.

5. The air compression system of claim 4, wherein the moisture separator assembly includes a liquid water separator for filtering the compressed air downstream of the cooler.

6. The air compression system of claim 1, wherein the internal combustion engine includes at least one cylinder and a piston driven in a reciprocal fashion within the at least one cylinder.

7. A method of operating an air compression system, the method comprising:
  compressing ambient air using an air compressor to convert the ambient air to compressed air and water;
  combusting a fuel-air mixture in an internal combustion engine to power the air compressor;
  separating the water from the compressed air exiting the air compressor in a moisture separating assembly;
  discharging a flow of compressed dry air from the moisture separating assembly away from the internal combustion engine and to an on-demand user application, the compressed dry air being discharged from the air compression system by the on-demand user application;
  discharging a separate flow of water from the moisture separating assembly;
  collecting the water discharged from the moisture separating assembly;
  measuring a flow rate of the compressed dry air to the on-demand user application with a sensor positioned between the on-demand user application and the moisture separating assembly; and
  feeding a portion of the collected water to the fuel-air mixture and into the internal combustion engine with a water injection system for combustion in the internal combustion engine in response to the measured flow rate of the compressed dry air.

8. The method of claim 7, further comprising discharging excess water from the water injection system as waste through a valve.

9. An air compression system comprising:
  an air compressor operable to draw in ambient air and compress that air to produce a flow of compressed air and water;
  an engine coupled to the air compressor, the engine operable to power the air compressor;
  a moisture separator assembly coupled to the air compressor and arranged to receive the flow of compressed air and water, the moisture separator assembly operable to separate a portion of the the water from the flow of compressed air and water and to discharge a flow of compressed dry air and a separate flow of liquid water;
  an air passageway extending between the moisture separator assembly and an on-demand user application, the air passageway positioned to direct the flow of compressed dry air away from the engine and to the on-demand user application to exit the air compression system;
  a reservoir positioned to receive the flow of liquid water discharged by the moisture separator assembly;
  a water injection system coupled to the engine and operable to draw water from the reservoir and inject that water into the engine for combustion;
  a sensor coupled to the air passageway and configured to measure a flow rate of the compressed dry air through the air passageway; and
  a controller operable to vary the quantity of water delivered to the engine by the water injection system,
  wherein the controller receives a signal from the sensor indicative of the measured flow rate of the compressed dry air, and wherein the controller varies the quantity of water delivered to the engine by the water injection system at least partially in response to the measured flow rate of the compressed dry air.

10. The air compression system of claim 9, wherein the controller is operable to set the quantity of water delivered to the engine to zero.

11. The air compression system of claim 9, wherein the air compressor includes a rotary screw compressor.

12. The air compression system of claim 9, wherein the moisture separator assembly includes a separator tank and a cooler.

13. The air compression system of claim 12, wherein the moisture separator assembly includes a liquid water separator for filtering the compressed air downstream of the cooler.

14. The air compression system of claim 1, further comprising an air filter positioned in the air passageway downstream of the moisture separator assembly to filter the compressed dry air.

15. The air compression system of claim 1, further comprising a valve positioned in the water passageway, the valve configured to selectively direct water to the water injection system or to discharge water from the air compression system.

* * * * *